Patented Apr. 23, 1946

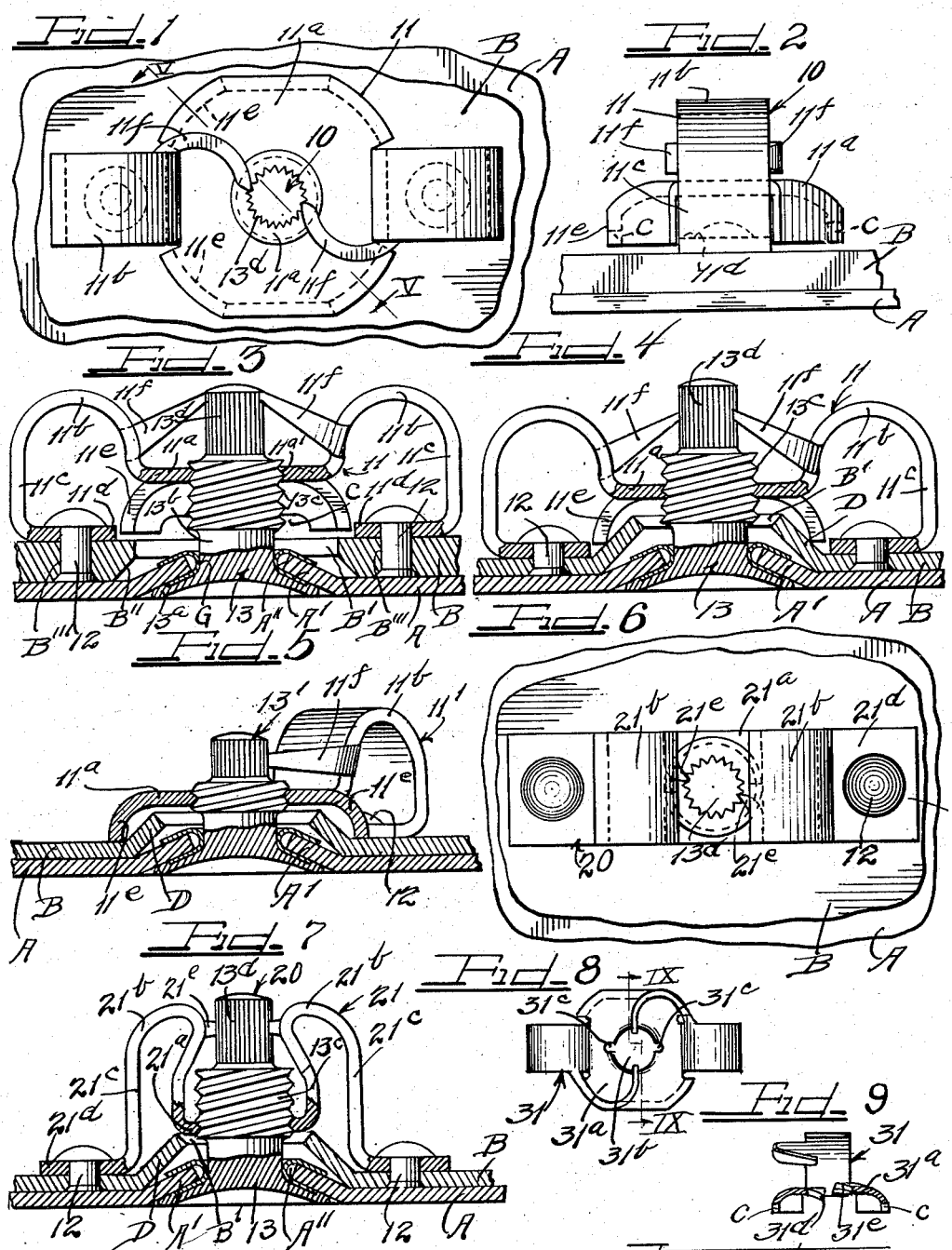

2,398,827

UNITED STATES PATENT OFFICE 2,398,827

COWL FASTENER

Matthew P. Graham and Anthony Venditty, Detroit, Mich., assignors to Thompson Products Inc., Cleveland, Ohio, a corporation of Ohio Application May 2, 1942, Serial No. 441,510

2 Claims. (Cl. 151—14)

This invention relates to separable fasteners adapted for detachably connecting parts of varying thickness.

More specifically this invention relates to fasteners especially adapted for securing cowling, inspection plates, panels, and the like in position on an airplane, which fasteners include spring mounted receptacles, threaded studs fitting the receptacles in screw-thread relation to deflect the spring mounted receptacles and resilient prongs or locking fingers on the receptacles adapted to register with serrations on the stud to ratchet over the serrations and thereby hold the stud against unauthorized separation while permitting authorized separation.

The fasteners of this invention can utilize one piece receptacles stamped from a single sheet of metal. The receptacles include a central plate portion which is apertured to receive the stud in screw-thread relation and bowed spring arms extending laterally from the central plate portion for mounting the receptacle in position on an apertured plate for example in such a manner that the central plate portion of the receptacle bridges the aperture in the mounting plate. The stud is rotatably mounted in an aperture of a second plate to be mounted on the mounting plate and has the threaded and serrated portion thereof extending through the aperture in the mounting plate. The threaded portion is adapted to be threaded into the plate portion of the receptacle and the serrated portion projects beyond the threaded portion to be acted on by a pair of resilient prongs, fingers or kerfs carried by the receptacle. These prongs or fingers engage diametrically opposed serrations on the stud and are arranged so that they must pass over the transverse diameter of the stud before ratcheting on the serrations as the stud is rotated in either direction. This arrangement of locking prongs or fingers will hold the stud against unauthorized rotation, such as might result from vibration of the parts. However, the locking arrangement will not interfere with authorized rotation of the stud to draw the plate portion of the receptacle against the mounting plate thereby fastening the plates together. The flat plate portion of the receptacle will carry an appreciable tension load. The spring arms tend to resist a drawing of the plate portion against the mounting plate and thereby additionally serve to tightly hold the plates together.

It is, then, an object of this invention to provide an improved fastener for detachably connecting apertured members such as plates of varying thickness.

A further object of this invention is to provide an improved receptacle for separable fasteners which is adapted to be spring mounted on an apertured mounting plate and is further adapted to receive a locking stud while holding the stud against unauthorized rotation.

Another object of this invention is to provide an improved cowling fastener composed of a receptacle having spring mounting arms, a stud for threaded connection with the receptacle, and locking means adapted to hold the stud against unauthorized rotation.

A still further object of the invention is to provide an improved receptacle for separable fasteners adapted to be stamped from a sheet of metal.

Another object of the invention is to provide a separable fastener adapted for securing cowling, panels and the like to an airplane and having diametrically opposed locking prongs for ratchet coaction with a serrated surface on a locking stud.

Other and further objects of the invention will be apparent to those skilled in the art from the following detailed description of the annexed sheet of drawings which, by way of preferred examples, shows several embodiments of the invention.

As shown on the drawing:

Figure 1 is a plan, or inside face view, of a pair of plates held together by the fastener according to this invention.

Figure 2 is an end elevational view of the fastener and plate assembly of Figure 1.

Figure 3 is a side elevational view, with parts in vertical cross section, of the fastener and plate assembly of Figure 1.

Figure 4 is a view similar to Figure 3 illustrating a manner in which the fastener of Figures 1 to 3 may be used with thin plates.

Figure 5 is a cross-sectional view along the line V—V of Figure 1 but illustrating a modified fastener having a shorter locking stud and a flatter receptacle especially adapted for connecting thin plates.

Figure 6 is a plan view similar to Figure 1 illustrating still another modified form of fastener according to this invention.

Figure 7 is a view similar to Figures 3 to 5 illustrating the modified fastener of Figure 6.

Figure 8 is a plan view of a stamped receptacle useful in all of the embodiments of the invention illustrating the manner in which a stud thread receiving cam can be provided by a simple stamping of the receptacle to eliminate the necessity for tapping the stud-receiving aperture of the receptacle.

Figure 9 is a vertical cross-sectional view of the receptacle shown in Figure 8, taken along line IX—IX of Fig. 8.

As shown on the drawing:

In Figures 1 to 3 inclusive, the reference numeral 10 indicates generally a fastener according to this invention as detachably connecting a pair of apertured metal plates including an outer plate A such as an airplane cowling piece, and an inner plate B such as an airplane body part or cowling mounting piece.

The plate A is embossed or dimpled as at A' as best shown in Figure 3, and the embossed portion A' defines a circular aperture A''. A metal grommet G is seated in the aperture A'' and embraces the embossed portion A'.

The plate B has a circular aperture B' therethrough which can be beveled or counterbored as at B'' to freely receive therein the embossed dimple portion A' of the plate A. The plate B also has rivet holes B''' therethrough at diametrically opposite portions of the aperture B'. These rivet holes can be countersunk at their outer ends to receive the heads of rivets in flush relation to the outer face of the plate.

The fastener 10 is composed of a receptacle 11 which, as explained above, can be stamped from a sheet of metal to provide a central plate portion 11a with a threaded central aperture 11a' therethrough together with bowed laterally extending spring arms 11b which are bowed upwardly from diametrically opposite edge areas of the central plate portion 11a. The spring arms 11b have vertical legs 11c with inturned horizontal apertured feet 11d adapted to seat on the inner face of the plate B and receive rivets 12 therethrough. The rivets 12 extend through the holes B''' in the plate B and have heads at the opposite ends thereof for fixedly securing the receptacle on the plate B.

The central plate portion 11a of the plate 11 extends beyond the sides of the spring arms 11b as shown in Figures 1 and 2 and has downturned flanges 11e around these extended portions to provide a cup. The flanges 11e, on each side of the cup, have a cut-out or relieved portion C (Figs. 2 and 3) so arranged as to permit the cup to straddle a dimple on a mounting plate. In effect, therefore, the cup has four bottom edges, one adjacent each side of each spring arm 11b, for bottoming on the plate B, when the spring arms 11b are deflected as when the locking stud draws the plate portion 11a toward the plate B.

The spring arms 11b have integral prongs or fingers 11f on opposed sides. These fingers or prongs extend over the plate portion 11a above the aperture 11a' therein.

The fastener also has a locking stud 13 provided with a head 13a for seating in the embossed dimple A' of the outer plate A. This head can have a groove in the under face thereof to receive the grommet G. The grommet G rotatably holds the locking stud in the aperture A'' of the plate A.

The stud has a cylindrical shank 13b extending from the head 13 and this shank has an externally threaded portion 13c adapted to fit into threaded interior 11a' of the plate portion 11a. The stud shank also has a longitudinally serrated surface 13d therearound above the threaded portion 13c. This serrated portion is adapted to fit between the prongs 11f in such a manner that the inner ends of the prongs will engage diametrically opposite serrations.

The stud head can have a screwdriver slot therein for rotation of the stud in the dimple A' to cause the threads 11c to engage the threads in the threaded aperture 11a' and draw the plate portion 11a of the receptacle toward the mounting plate B. As the stud is rotated the prongs 11f will ratchet over the serrations 13d and, as illustrated in Figure 1, these prongs must be deflected beyond the diameter of the stud shank before they will permit rotation. As a result, the prongs will intermittently ratchet over the teeth or serrations during rotation of the stud and will serve to hold the stud against unauthorized rotation.

The bottom edges of the downturned flanges 11e can be drawn by the stud all the way down against the mounting plate B if desired, or alternatively, the stud need not be threaded into the receptacle sufficient to effect this seating, since the spring arms are sufficient to hold the plates A and B together. In any event, tension loads tending to separate the plates A and B will tend to seat the flanges 11e on the plate B so that high tension loads can be carried by the fastener. The extended thread area 13c on the stud shank makes possible the use of the same sized receptacle and stud in many different installations involving plates of different thicknesses. For example if thin plates are used the stud is merely threaded further into the receptacle than when thick plates are used. The serrated area 13d is sufficiently long so that the prongs 11f can engage the serrations even when the stud is threaded into the receptacle down to a point adjacent the stud head.

Reverse rotation of the stud will unscrew the same from the receptacle but this rotation will, of course, be resisted by the prongs, necessitating manual effort to effect the rotation because the prongs must ratchet over the serrations. As a result, the fastener will not become loosened due to vibration or other causes tending to rotate the stud during flight of an airplane.

In the modification of Figure 4 parts identical with parts described in Figures 1 to 3 have been marked with the same reference numerals. In this modification, however, the inner plate or mounting plate B is thinner than the plate B of Figures 1 to 3 and has an embossed dimple D defining the aperture B'. This embossed dimple D receives the dimple A' of the plate A and in turn extends into the cup area of the plate portion 11a so as to be surrounded by the flanges 11e. As the stud 13 is rotated to draw the plate portion 11a toward the mounting plate B the relieved portions C of the flanges 11e will permit the four bottom flange edges to bottom on the flat plate adjacent the dimple. In other words, the relieved portions of the flanges permit the cup to straddle the dimple as better illustrated in the diagonal section in Figure 5. As shown in Figure 4 the dimple D may also extend between the flanges 11e under the spring arms 11b. The fastener of Figure 4 operates in the same manner as described in Figure 3, it only being necessary to thread the stud further into the receptacle for drawing the thin plates together. The dimple arrangement D is preferred on the plate B when the plate is quite thin so that the aperture B' can be made as small as possible and so that the dimple A' can be seated without necessity for beveling the aperture.

The modification shown in Figure 5 is mechanically the same as that shown in Figure 4 with the exception that the stud 13' is shorter and contains a narrow threaded area while the receptacle 11' is flatter. The diagonal diameter between the bottom edges of the flanges 11e is greater than the base diameter of the dimple D so that these bottom edges will seat on the flat plate B. The structure of Figure 5 is preferred where only a small amount of clearance is provided adjacent the inner face of the mounting plate B.

In the modification shown in Figures 6 and 7, a fastener assembly 20 is used to join the plates A and B. The plates A and B are apertured and dimpled in a manner similar to that described in connection with Figures 4 and 5. The stud 13 is identical with the stud described in Figures 1 to 4. However, a different type of receptacle is used. This receptacle 21 is stamped from a flat strip of metal to provide the internally threaded apertured central plate portion 21a for receiving the thread 13c of the stud and the upwardly bowed spring arms 21b are formed on diametrically opposite sides of the plate portion to extend somewhat inwardly over the plate portion and thence outwardly and downwardly along the vertical legs 21c to outturned feet 21d receiving the rivets 12.

The inwardly projecting portions of the spring arms 21b are stamped or cut so as to provide kerfs or tangs 21e for engaging the serrated surface 13d of the stud. The extending cup-shaped portion of the plate portion is eliminated and the flat face of the plate is adapted to be drawn against the inner end of the dimple D on the mounting plate B as best shown in Figure 7.

In this receptacle the downturned flanges 11e of the receptacle 11 is eliminated and the flat plate portion is used as an abutment surface.

Any of the receptacles described in Figures 1 to 7 can be made in accordance with the disclosures of Figures 8 and 9 so that an internal tapping or threading of the aperture in the plate portions 11a or 21a can be eliminated. As shown in Figure 8 the plate portion 31a of the receptacle 31 has a central aperture 31b with diametrically opposite cut-out portions 31c to receive the leading ends of the double thread on the stud. This plate portion is then stamped downwardly on one side of each cut-out portion as at 31d (Fig. 9) and upwardly on the other side of each cut-out portion as at 31e to provide a screw thread arrangement for receiving the double threads on the stud. In other words the plate portion is so stamped that it provides, in itself, a thread cam for receiving the double thread on the stud. This will eliminate the necessity for tapping the aperture 31b with screw threads. By virtue of this construction the plate metal can be quite thin.

From the above descriptions it will be understood that receptacles of this invention can be made in one piece to have integral spring supports and resilient locking instrumentalities such as prongs, fingers, kerfs and the like. The studs can be made on automatic machines and since they have threaded portions and serrated areas of appreciable length standardized sizes will accommodate a large range of plate thicknesses.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A separable fastener adapted for detachably connecting a plurality of apertured plates which comprises a stamped receptacle having an apertured central portion, laterally extending bowed spring arms for attachment to the innermost plate, and a flange portion extending from said apertured central portion toward said innermost plate to engage the innermost plate, a stud rotatably mounted in the outermost plate having a threaded shank portion for threaded engagement in the aperture of the receptacle and a serrated portion for projecting beyond the apertured portion of said receptacle, and a resilient prong on each spring arm coacting with diametrically opposite serrations on said serrated stud portion to resist rotation of the stud relative to the receptacle.

2. A fastener for detachably connecting a plurality of apertured plates, with the innermost plate having an inwardly embossed dimple defining the aperture thereof, which comprises a receptacle having spring mounting arms for fixed attachment to the innermost plate and a central cup-shaped portion for fitting over the dimple on said innermost plate, a stud adapted to be rotatably mounted in the outermost plate having a shank projecting through the plates and cup-shaped portion of the receptacle in threaded engagement with said cup-shaped portion, a longitudinally serrated portion on the free end of said stud shank, and resilient prongs on said receptacle engaging opposite sides of said serrated portion to hold the stud against unauthorized rotation whereby rotation of the stud will draw the cup-shaped portion of the receptacle against the innermost plate.

MATTHEW P. GRAHAM.
ANTHONY VENDITTY.